US010956322B2

(12) United States Patent
Ash et al.

(10) Patent No.: US 10,956,322 B2
(45) Date of Patent: Mar. 23, 2021

(54) STORAGE DRIVE DEPENDENT TRACK REMOVAL IN A CACHE FOR STORAGE

(71) Applicant: International Business Machines Corporation, Armonk, NY (US)

(72) Inventors: Kevin J. Ash, Tucson, AZ (US); Matthew G. Borlick, Tucson, AZ (US); Lokesh M. Gupta, Tucson, AZ (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 463 days.

(21) Appl. No.: 15/171,938

(22) Filed: Jun. 2, 2016

(65) Prior Publication Data

US 2017/0351609 A1   Dec. 7, 2017

(51) Int. Cl.
*G06F 12/0804* (2016.01)
*G06F 12/121* (2016.01)
*G06F 12/0868* (2016.01)

(52) U.S. Cl.
CPC ...... *G06F 12/0804* (2013.01); *G06F 12/0868* (2013.01); *G06F 12/121* (2013.01); *G06F 2212/462* (2013.01)

(58) Field of Classification Search
CPC .... G06F 2212/69; G06F 3/0416; G06F 3/044; G06F 2203/04106; G06F 2203/04108; G06F 3/013; G06F 3/023; G06F 3/0412; G06F 3/046; G06F 12/0804; G06F 12/0868; G06F 12/121; G06F 2212/462
See application file for complete search history.

(56) References Cited

U.S. PATENT DOCUMENTS

| 4,636,946 A | * | 1/1987 | Hartung | G06F 12/0804 711/113 |
| 4,868,734 A | * | 9/1989 | Idleman | G06F 12/0866 710/29 |
| 5,060,144 A | * | 10/1991 | Sipple | G06F 9/52 710/200 |

(Continued)

OTHER PUBLICATIONS

Seagate Technology, Nov. 2011, "Data Sheet Barracuda—The Power of One," pp. 1-2.*

(Continued)

*Primary Examiner* — Andrew J Cheong
(74) *Attorney, Agent, or Firm* — William K. Konrad; Konrad Raynes Davda & Victor LLP

(57) ABSTRACT

In one embodiment, storage drive dependent track removal processing logic performs destage tasks for tracks cached in a cache as a function of whether the storage drive is classified as a fast class or as slow class of storage drives, for example. In one embodiment, a destage task configured for a slow class storage drive, transfers an entry for a track selected for destaging from a main cache list to a wait cache list to await destaging to the slow class drive. A destage task configured for a fast class storage drive allows the cache list entry for the selected track to remain on the main cache list while the selected track is being destaged to the fast class storage drive, thereby bypassing the transfer of the entry to a wait cache list. Other features and aspects may be realized, depending upon the particular application.

18 Claims, 6 Drawing Sheets

(56) References Cited

U.S. PATENT DOCUMENTS

| | | | | |
|---|---|---|---|---|
| 5,440,686 | A * | 8/1995 | Dahman | G06F 12/121 345/537 |
| 5,913,223 | A * | 6/1999 | Sheppard | G06F 12/0864 711/118 |
| 5,991,775 | A * | 11/1999 | Beardsley | G06F 12/0866 707/999.205 |
| 6,460,122 | B1 * | 10/2002 | Otterness | G06F 11/1076 711/122 |
| 7,543,108 | B2 * | 6/2009 | Kakihara | G06F 1/3221 711/112 |
| 8,255,637 | B2 * | 8/2012 | Yochai | G06F 11/1451 707/649 |
| 8,478,945 | B2 * | 7/2013 | Ash | G06F 12/0804 711/118 |
| 8,966,178 | B2 * | 2/2015 | Ash | G06F 12/0868 711/118 |
| 10,083,067 | B1 * | 9/2018 | Shveidel | G06F 9/52 |
| 2002/0120510 | A1 * | 8/2002 | Kawakami | G06Q 30/02 705/14.1 |
| 2003/0005457 | A1 * | 1/2003 | Faibish | H04N 7/17336 725/94 |
| 2003/0105928 | A1 * | 6/2003 | Ash | G06F 12/0804 711/136 |
| 2003/0149843 | A1 * | 8/2003 | Jarvis | G06F 12/123 711/133 |
| 2005/0160189 | A1 * | 7/2005 | McNeill, Jr. | G06F 3/0616 710/1 |
| 2008/0168220 | A1 * | 7/2008 | Gill | G06F 12/0804 711/113 |
| 2009/0037660 | A1 * | 2/2009 | Fairhurst | G06F 12/126 711/129 |
| 2010/0318744 | A1 * | 12/2010 | Benhase | G06F 12/0868 711/136 |
| 2011/0191534 | A1 * | 8/2011 | Ash | G06F 12/0804 711/113 |
| 2011/0276746 | A1 * | 11/2011 | Pruthi | G06F 12/0866 711/103 |
| 2012/0079207 | A1 * | 3/2012 | Yochai | G06F 11/1451 711/141 |
| 2012/0102274 | A1 * | 4/2012 | Nonogaki | G06F 15/167 711/152 |
| 2013/0185494 | A1 * | 7/2013 | Ash | G06F 12/0868 711/105 |
| 2014/0082288 | A1 * | 3/2014 | Beard | G06F 12/0875 711/123 |
| 2014/0082296 | A1 * | 3/2014 | Ash | G06F 12/0866 711/136 |
| 2014/0304479 | A1 * | 10/2014 | Benhase | G06F 12/122 711/136 |
| 2015/0046656 | A1 * | 2/2015 | Blinick | G06F 12/0848 711/129 |
| 2015/0058561 | A1 * | 2/2015 | Ash | G06F 3/0641 711/114 |
| 2015/0134914 | A1 * | 5/2015 | Ash | G06F 12/0891 711/136 |
| 2015/0199138 | A1 * | 7/2015 | Ramachandran | G06F 12/122 711/103 |
| 2016/0162422 | A1 * | 6/2016 | Weber | G06F 13/28 710/308 |
| 2017/0351619 | A1 * | 12/2017 | Ash | G06F 12/126 |

OTHER PUBLICATIONS

Alliance Memory Inc., Nov. 2007, "512K x 16 Bit Super Low Power CMOS SRAM—AS6C8016" v 1.0, pp. 1 and 4.*

Computer Desktop Encyclopedia—definition of "logic" (http://lookup.connputerlanguage.com/host_app/search?cid=C999999&term=logic&lookup=Go).*

"B-tree", Wikipedia, pp. 14, [online][retrieved May 17, 2016] https://en.wikipedia.org/wiki/Btree.

* cited by examiner

STORAGE DRIVE DEPENDENT TRACK REMOVAL IN A CACHE FOR STORAGE

BACKGROUND OF THE INVENTION

1. Field of the Invention

The present invention relates to a computer program product, system, and method for cache management of track removal in a cache for a storage.

2. Description of the Related Art

A cache management system buffers tracks in a storage device recently accessed as a result of read and write operations in a memory often referred to as a cache, which is typically faster than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

A cache manager of a cache management system may maintain a linked list having one entry for each track stored in the cache, which may comprise write data buffered in cache before writing to the storage device, or read data. In the commonly used Least Recently Used (LRU) cache technique, if a track in the cache is accessed, i.e., a cache "hit", then the entry in the LRU list for the accessed track is moved by a cache manager to a Most Recently Used (MRU) end of the list. If the requested track is not in the cache, i.e., a cache miss, then the track in the cache whose entry is at the LRU end of the list may be removed. Other techniques such as a "B-tree" algorithm may be used to sort the entries of a cache list representing the tracks cached in the cache.

The cache manager may remove tracks from the cache based on various criteria such as whether the cache is full and how many entries are on the cache list. If the cache or cache list is deemed to be sufficiently full, the cache manager may spin off tasks to scan the cache list to look for suitable tracks to remove from the cache. One removal operation, often referred to as demoting a track, simply deletes the track from cache and deletes the corresponding entry from the cache list. For example, a track containing read data may be demoted by a cache manager.

Another track removal operation destages the track from cache for sending the track to storage. For example, a track containing write data may be destaged from cache by the cache manager for storing in storage. Upon destaging the track from cache, the corresponding entry in the cache list is again deleted.

The cache manager typically uses a "lock," often referred to as a "list lock" to lock the cache list to prevent modification of the cache list by other processors while the scan is in progress. As tracks are selected for destage from the cache list, the corresponding entries are removed from the primary list, referred to herein as the "main" cache list and moved into a separate, secondary list often referred to as a "wait cache" list to await completion of the destaging process. If the entries for tracks selected for destaging were not removed from the main cache list, then other destage tasks may encounter those entries and process the entries to determine if the tracks should be destaged. Upon determining that tracks of entries have already been selected for destaging, the other tasks will skip those entries and move on to the next entry in the cache list. By removing the cache entries for the tracks selected for destaging from the main list, other tasks scanning the main cache list do not encounter those entries for tracks selected for destaging. As a result, unnecessary processing of the cache list entries for tracks already selected for destaging may be reduced by moving the cache entries for the selected tracks to the wait cache list.

To transfer an entry for a track selected for destaging from the main cache list to the wait cache list, the destage task typically acquires the list lock of the main cache list, removes the entry from the main cache list and releases the main cache list lock. In addition, the destage task acquires the wait cache list lock, adds an entry to the wait cache list for the track selected for destaging, and releases the wait cache list lock.

SUMMARY

Storage drive dependent track removal processing in one aspect of the present description, includes methods and apparatus which determine whether a storage drive is one of a first class and a second class of storage drives, and process tracks cached in a cache for track removal as a function of whether the storage drive is one of the first class and the second class of storage drives. For example, in one embodiment, the second class of storage drives may be defined to have an input/output speed performance characteristic which exceeds a corresponding input/output speed performance characteristic of the first class of storage drives.

In one embodiment, storage drive dependent track removal processing includes performing destage tasks, each destage task selecting a track for destaging from the cache to the storage drive wherein the selected track is represented by an entry of a first cache list of entries representing tracks cached in the cache. If the storage drive is of the first class, the destage task is configured to remove the entry from the first cache list and add it as a second entry to a second cache list of entries wherein the second entry represents the selected track. The destage task configured for the storage drive of the first class further includes destaging the track from the cache to the storage drive, and removing the second entry from the second cache list.

If the storage drive is of the second class, the destage task is configured to permit the entry representing the track selected for destaging to remain on the first cache list such that transferring the entry to a second cache list is bypassed if storage drive is of the second class. The destage task configured for the storage drive of the second class further includes destaging the track from the cache to the storage drive, and removing the second entry from the first cache list. Other embodiments include corresponding computer systems, apparatus, and computer programs recorded on one or more computer storage devices, each configured to perform the actions of the methods.

In another aspect of storage drive dependent track removal processing in accordance with the present description, a storage drive may be classified as a first class storage drive or a second class storage drive depending upon whether the storage drive has an input/output speed performance characteristic which exceeds a threshold. In one embodiment, the input/output speed performance characteristic of the storage drive is a function of an average latency of destaging a track from the cache to the storage drive. In another aspect, a threshold for comparison is a function of a duration of time taken to obtain a list lock for the first cache list.

In yet another aspect of storage drive dependent task removal processing in accordance with the present description, cache management data structures and destage tasks may be configured as a function of whether the storage drive has been classified as one of a first class and a second class of storage drives. Implementations of the described techniques may include hardware, a method or process, or computer software on a computer-accessible medium.

Other features and aspects may be realized, depending upon the particular application.

DETAILED DESCRIPTION

Figure 1:
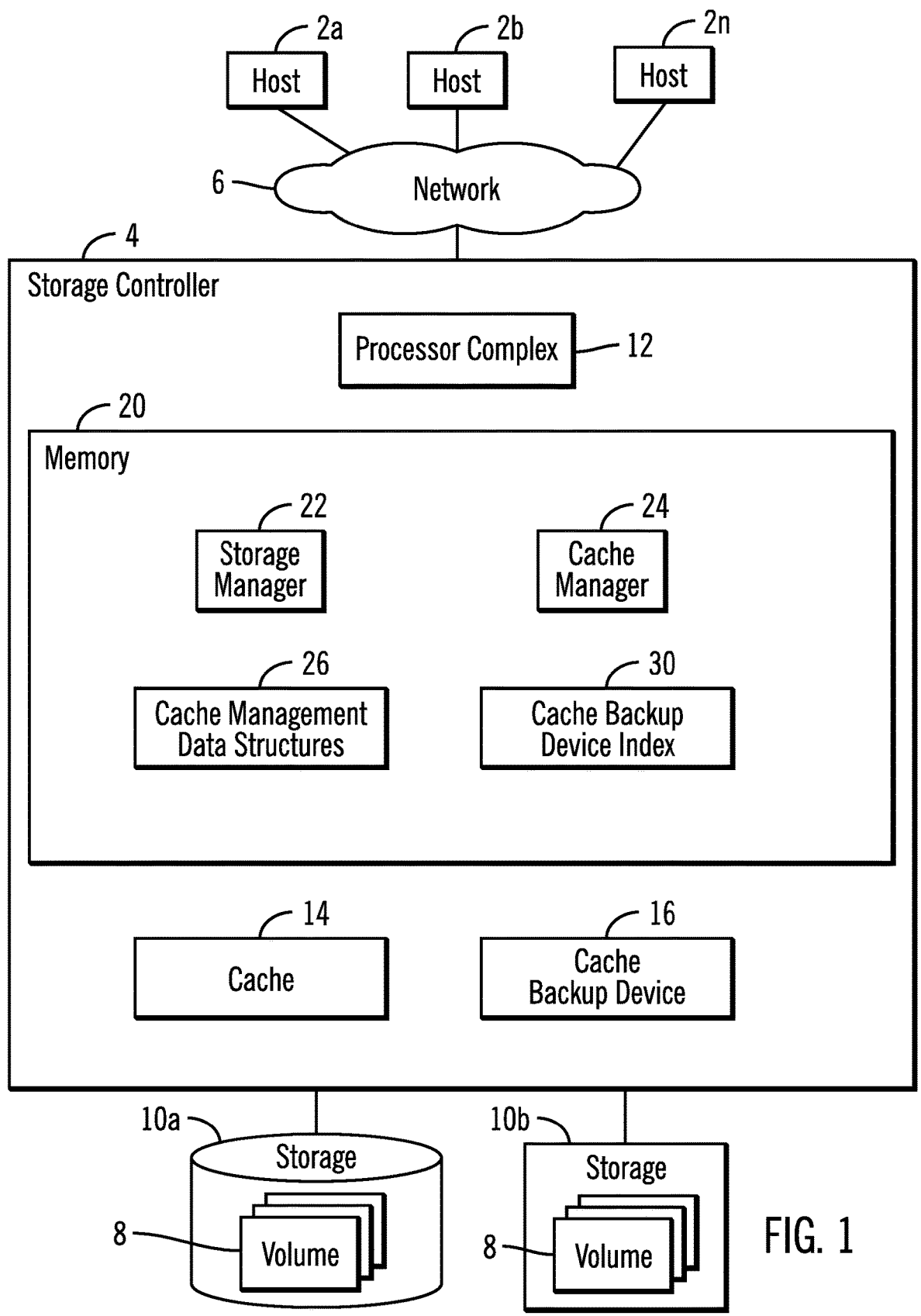
FIG. 1 illustrates an embodiment of a computing environment employing storage drive dependent track removal processing in accordance with one aspect of the present description.

A system of one or more computers can be configured to perform storage drive dependent track removal operations for a cache in accordance with one aspect of the present description, by virtue of having software, firmware, hardware, or a combination of them installed on the system that in operation causes or cause the system to perform storage drive dependent track removal operations. For example, one or more computer programs can be configured to perform storage drive dependent track removal operations for a cache by virtue of including instructions that, when executed by data processing apparatus, cause the apparatus to perform the actions.

One general aspect of storage drive dependent track removal operations in accordance with the present description includes storage drive dependent track removal processing logic configured to determine whether a storage drive may be classified as one of a first class and a second class of storage drives, and to perform destage tasks for tracks cached in a cache as a function of whether the storage drive is classified in the first class or in the second class of storage drives. In one embodiment, the storage drive dependent track removal processing logic may include drive classification logic which classifies storage drives on the basis of performance characteristics, for example. Thus, the second class of storage drives may have an input/output speed performance characteristic for example, which exceeds a corresponding input/output speed performance characteristic of the first class of storage drives. Accordingly in this example, storage drives classified in the first class may be referred to generally as a "slow class" drive as compared to storage drives classified in the second class which may be referred to generally as a "fast class" drive, for example. It is appreciated that in storage drive dependent track removal processing in accordance with the present description, storage drives may be classified into two or more classifications using other classification criteria, depending upon the particular application.

In another aspect, the storage drive dependent track removal processing logic may further include destage task configuration logic to configure destage tasks on the basis of the classification of the storage drive for which the destage task is to be performed. For example, each destage task may scan a cache list for the storage drive to select a track which is to be destaged from cache. If the storage drive has been classified as a slow class drive, the destage task if configured for a slow class storage drive, removes the entry for the selected track from the "main" cache list and adds it to a secondary cache list (referred to herein as the "wait cache" list) to await destaging to the slow class drive. As a result, other tasks scanning the main cache list will not encounter the cache list entry which has been removed from the main cache list while the selected track awaits destaging. Consequently, task efficiency and resource utilization may be improved in many applications. Once destaging of the selected track from the cache to the slow class storage drive has been completed, the cache list entry for that track which had been added to the wait cache list, may be removed from the wait cache list.

Conversely, if the storage drive has been classified as a fast class drive, a destage task configured for a fast class storage drive allows the cache list entry for the selected track to remain on the main cache list while the selected track is being destaged to the fast class storage drive. Once destaging of the selected track from the cache to the fast class storage drive has been completed, the cache list entry for that track which was allowed to remain on the main cache list, may be removed from the main cache list.

It is appreciated herein that where the storage drive to which the selected track is being destaged is classified as a fast class drive, the destage task may be completed in a relatively short amount of time. Hence, the amount of time that the entry for the selected track remains on the main cache list while the selected track is destaged to the fast class storage drive, may correspondingly be short in duration. As a result, the number of other tasks which might encounter the entry for the selected track on the main cache list may be significantly reduced for a fast class storage drive as compared to the likely number of such encounters should an entry for a track being destaged to a slow class drive, be permitted to remain on the main cache list.

In another aspect of the present description, it is recognized that one suitable criterion for classifying fast class storage drives versus slow class storage drives may be a function of a comparison of the average latency to destage a track to a storage drive, to the average amount of time to obtain a list lock for cache lists. It is appreciated that transferring a cache list entry from the main cache list to a wait cache list, typically employs obtaining and releasing two cache list locks, a first cache list lock, that is, the main cache list lock, to remove the entry from the main cache list, and a second cache list lock, that is, the wait cache list lock, to add the entry to the wait cache list. By comparison, a destage task configured for a fast class storage drive in one embodiment, bypasses removing the entry from the main cache list and adding an entry to the wait cache list.

Thus, it is recognized that in one embodiment, in a destage task configured for a storage drive classified as a fast class storage drive, the obtaining and releasing of two list locks may be bypassed. Accordingly, one suitable criterion for classifying fast class storage drives versus slow class storage drives for storage drive dependent track removal processing in accordance with the present description, may be a function of a comparison of the average latency to destage a track to a storage drive, to a value calculated as twice the average amount of time to obtain a list lock for cache lists. If the average latency to destage a track to a storage drive is less than twice the average amount of time to obtain a list lock for cache lists, the storage drive may be classified as a fast class storage drive in this example. Conversely, if the average latency to destage a track to a storage drive, is greater than twice the average amount of time to obtain a list lock for cache lists, the storage drive may be classified as a slow class storage drive in this example.

It is appreciated that other criteria may be used to classify storage drives for storage drive dependent track removal processing in accordance with the present description, depending upon the particular application. For example, if the average latency to destage a track to a storage drive, is greater than N times the average amount of time to obtain a list lock for cache lists, the storage drive may be classified as a slow class storage drive in this example, where N is a variable. In one example, the variable N is 2 as described above. In another example, the variable N may be in value within a range such as a range of 1 to 4, for example. Moreover, other performance characteristics may be utilized to classify storage drives for storage drive dependent track removal processing in accordance with the present description, depending upon the particular application. For example, a performance characteristic of a storage drive may be compared to a threshold such that storage drives having performance characteristics which exceed the threshold are classified in one class of storage drives and storage drives having a performance characteristic which does not exceed the threshold, are classified in another storage drive classification.

Implementations of the described techniques may include hardware, a method or process, or computer software on a computer-accessible medium. FIG. 1 illustrates an embodiment of a computing environment employing storage drive dependent track removal processing in accordance with the present description. A plurality of hosts 2a, 2b . . . 2n may submit Input/Output (I/O) requests to a storage controller or storage control unit 4 over a network 6 to access data at volumes 8 (e.g., Logical Unit Numbers, Logical Devices, Logical Subsystems, etc.) in storage represented by a plurality of storage drives 10a, 10b. The storage controller 4 includes a processor complex 12, including one or more processors with single or multiple cores, one or more caches 14, one or more cache backup devices 16, to backup tracks in the cache 14. The cache 14 caches cache data transferred between the hosts 2a, 2b . . . 2n and the storage drives 10a, 10b. In this manner, the cache 14 maintains tracks in the storage subject to Input/Output (I/O) requests. The cache backup device 16 may provide non-volatile storage of tracks in the cache 14. In a further embodiment, the cache backup device 16 may be located in a cluster or hardware on a different power boundary than that of the cache 14.

The storage controller 4 has a memory 20 that includes a storage manager 22 for managing the transfer of tracks transferred between the hosts 2a, 2b . . . 2n and the storage 10a, 10b and a cache manager 24 that manages data transferred between the hosts 2a, 2b . . . 2n and the storage drives 10a, 10b in the cache 14 and a cache backup device 16. A track as represented by a track 25 (FIG. 2) may comprise any unit of data configured in the storage 10a, 10b, such as a track, Logical Block Address (LBA), etc., which is part of a larger grouping of tracks, such as a volume, logical device, etc. The cache manager 24 (FIG. 1) maintains cache management data structures 26 to manage read (unmodified) and write (modified) tracks in the cache 14. A cache backup device index 30 provides an index of track identifiers to a location in the cache backup device 16.

The storage manager 22 and cache manager 24 are shown in FIG. 1 as program code loaded into the memory 20 and executed by the processor complex 12. Alternatively, some or all of the functions may be implemented in hardware devices in the storage controller 4, such as in Application Specific Integrated Circuits (ASICs).

In some embodiments, the cache 14 may store tracks in a log structured array (LSA), where tracks are written in a sequential order as received, thus providing a temporal ordering of the tracks written to the cache 14. In a LSA, later versions of tracks already present in the LSA are written at the end of the LSA. In alternative embodiments, the cache 14 may store data in formats other than in an LSA.

In one embodiment, the cache 14 may comprise a Random Access Memory (RAM), such as a Dynamic Random Access Memory (DRAM), or may comprise a flash memory, such as a solid state device, or both, and the storage drives 10a, 10b may be comprised of one or more sequential access storage devices, such as hard disk drives and magnetic tape or may include non-sequential access storage devices such as solid state drives (SSD), for example. Each storage drive 10a, 10b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, etc. In one embodiment, the cache 14 is a faster access device than the storage drives 10a, 10b. Further, the cache 14 may have a greater cost per unit of storage than storage devices in the storage drives 10a, 10b.

As explained in greater detail below, in this example, the storage drive 10a is classified as a slow class storage drive and the storage drive 10b is classified as a fast class storage drive. Accordingly, in one embodiment, the fast class storage drive 10b may have superior input/output performance characteristics as compared to the slow class storage drive 10a, particularly with respect to destaging tracks from the cache 14 to the respective storage drives 10a, 10b. Thus, in one example, the storage drive 10a may be a hard disk drive and the storage drive 10b may be a solid state drive, for example, having faster input/output characteristics than the storage drive 10a. However, it is appreciated that the storage drives 10a, 10b may comprise other types of sequential or non-sequential access storage devices depending upon the particular application. Although described in connection with two storage drives and two associated storage drive classifications, it is further appreciated that storage drive dependent track removal in accordance with the present description may have a greater number of storage drives or a greater number of storage drive classifications, or both, depending upon the particular application.

The cache 14 may be part of the memory 20 or implemented in a separate memory device, such as a DRAM. In one embodiment, the cache backup device 16 may comprise a non-volatile backup storage (NVS), such as a non-volatile memory, e.g., battery backed-up Random Access Memory (RAM), static RAM (SRAM), etc.

The network 6 may comprise a Storage Area Network (SAN), a Local Area Network (LAN), a Wide Area Network (WAN), the Internet, and Intranet, etc.

Figure 3:
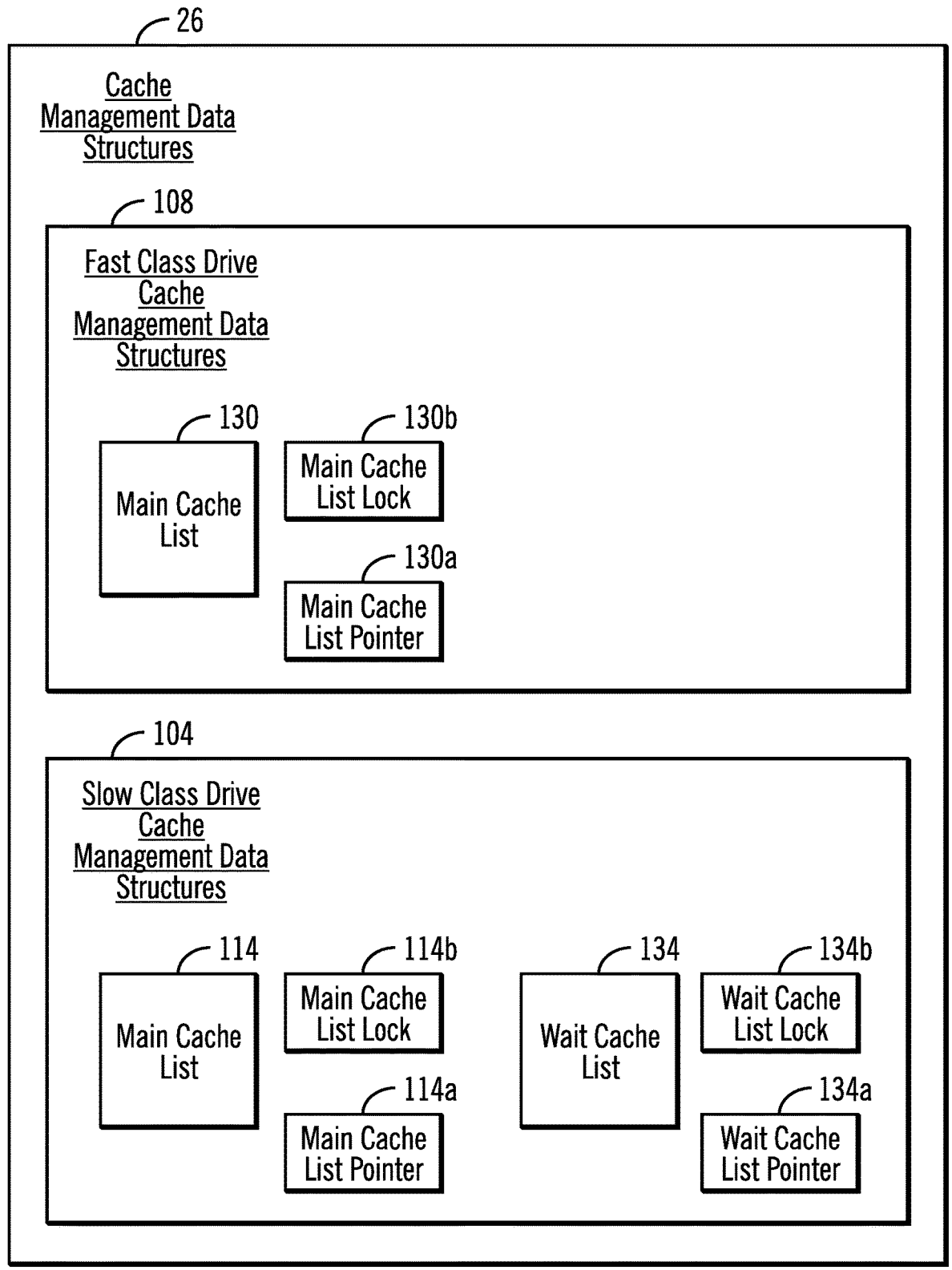
FIG. 3 illustrates an embodiment of data structures configured for storage drive dependent track removal processing in accordance with one embodiment of the present description.

FIG. 3 illustrates an embodiment of the cache management data structures 26 including slow class drive cache management data structures 104 to support cache operations for tracks of the slow class storage drive 10a. The cache management data structures 26 further includes fast class drive cache management data structures 108 to support cache operations caching for tracks of the fast class storage drive 10b.

Figure 4:
FIG. 4 illustrates an example of a cache list entry employed in a cache list data structure of FIG. 3.

In this embodiment, the slow class drive cache management data structures 104 include a first cache list referred to here as a "main cache list" 114 providing a list of modified sequential and non-sequential tracks in a portion of the cache 14 allocated to cache tracks from a slow class storage drive such as the slow class storage drive 10a (FIG. 1), for example. Thus, each entry as represented by the cache list entry 120 of FIG. 4 identifies one or more tracks which have been cached in an allocated portion of the cache 14 (FIG. 1). The tracks identified by the main cache list 114 (FIG. 3) were cached from a slow class storage drive, such as the storage drive 10a of FIG. 1. The entries of the main cache list 114 may be ordered using a suitable algorithm. For example, cache list entries for tracks cached from a non-volatile storage (NVS) are frequently ordered using B-tree algorithm and cache list entries for tracks cached from a non-NVS storage are frequently ordered using a least recently used (LRU) algorithm. Other algorithms may be used to order cache list entries, depending upon the particular application.

In certain embodiments, a portion of the cache backup device 16 is allocated for each storage drive having tracks cached in the cache 14, to store backup copies of tracks cached in the cache 14. Upon determining that the portion of the cache backup device 16 allocated to the slow class storage drive 10a is full or the main cache list 114 is full, the main cache list 114 for modified tracks may be used to destage modified tracks from the cache 14 to the slow class storage drive 10a, so that the copy of those tracks in the cache backup device 16 may be discarded to make room in the cache backup device 16 for new modified tracks. In some embodiments, the slow class drive cache management data structures 104 may further include a spatial index (not shown) providing a spatial ordering of the modified tracks based on the physical locations in the storage 10a at which the modified tracks are stored.

In this embodiment, the fast class drive cache management data structures 108 similarly include a first cache list referred to here as a "main cache list" 130 providing a list of modified sequential and non-sequential tracks in a portion of the cache 14 allocated to cache tracks from a fast class storage drive such as the fast class storage drive 10b (FIG. 1), for example. Here too, each entry as represented by the cache list entry 120 of FIG. 4 identifies one or more tracks which have been cached in an allocated portion of the cache 14 (FIG. 1). The tracks identified by the main cache list 130 (FIG. 3) were cached for a fast class storage drive, such as the storage drive 10b of FIG. 1. Here too, the entries of the main cache list 130 may be ordered using a suitable algorithm such as a B-tree or LRU algorithm, for example, as discussed above. Other algorithms may be used to order cache list entries, depending upon the particular application.

In certain embodiments, upon determining that the portion of the cache backup device 16 allocated to the fast class storage drive 10b is full or that the main cache list 130 is full, the main cache list 130 for modified tracks may be used to destage modified tracks from the cache 14 to the fast class storage drive 10b, so that the copy of those tracks in the cache backup device 16 may be discarded to make room in the cache backup device 16 for new modified tracks for the fast class storage drive 10b. In some embodiments, the fast class drive cache management data structures 108 may further include a spatial index (not shown) providing a spatial ordering of the modified tracks based on the physical locations in the storage 10b at which the modified tracks are stored.

In accordance with one aspect of the present description, the slow class drive cache management data structures 104 further include a second cache list referred to herein as a "wait cache list" 134 providing a selected list of modified sequential and non-sequential tracks cached in a portion of the cache 14 allocated to the slow class storage drive 10a (FIG. 1), for example, and awaiting destaging. Accordingly, upon selecting a track from the list of entries of the main cache list 114 for destaging, the entry for the selected track is transferred from the main cache list 114 to the wait cache list 134 to await completion of the destaging operation for the selected track, which destages the selected track to the slow class. As a result, other tasks scanning the main cache list 114 will not encounter the cache list entry which has been removed from the main cache list 114 while the selected track awaits destaging on the wait cache list 134.

Conversely, in accordance with another aspect of the present description, the fast class drive cache management data structures 108 lack a second cache list referred to here as a "wait cache list". Upon selecting a track for destaging from the main cache list 130 for the fast class storage drive 10b, instead of transferring the entry for the selected track from the list of entries of the main cache list 130 to a wait cache list to await destaging, the entry for the selected track is permitted to remain on the main cache list 130 to await completion of the destaging operation for the selected track, which destages the selected track to the fast class storage drive.

It is appreciated herein that a destage task directed to a fast class storage drive such as the storage drive 10b, for example, may be completed in a relatively short amount of time. Hence, the amount of time that the entry for the selected track remains on the main cache list 130 while the selected track is destaged to the fast class storage drive 10b, may correspondingly be short in duration. As a result, the number of other tasks which might encounter the entry for the selected track on the main cache list 130 may be significantly reduced for the fast class storage drive 10b as compared to the likely number of such encounters should an entry for a track being destaged to the slow class drive 10a, be permitted to remain on the main cache list 114, for example.

In the illustrated embodiment, each list 114, 130, and 134 has an associated pointer 114a, 130a, and 134a which points to the location of an entry of the associated list 114, 130, and 134. Each pointer 114a, 130a, and 134a permits a cache manager, such as the cache manager 24, to release an associated list lock 114b, 130b, and 134b, when a track has been identified during a scan of candidate entries of the associated list 114, 130, and 134, as a track suitable for track removal processing such as destaging the track, for example.

By releasing the list lock, the cache manager allows other processors to have access to the list while the identified track is processed for track removal. In one embodiment, before the list lock is released, the position of the previous entry in the list may be stored in the associated cursor or pointer so that the pointer value points to the prior entry in the list. Once the list lock is released, the track identified for track removal processing may be processed to remove the track from cache. Once the track removal processing of the identified track is completed, the list lock may be reacquired and the scan may be resumed at the list entry identified by the pointer.

It is appreciated that the cache management data structures may have data structures other than those depicted in FIG. 3. For example, a track index (not shown) may provide an index of tracks in the cache 14 to control blocks in a control block directory (not shown). Other examples include an unmodified sequential list (not shown) providing a temporal ordering of unmodified sequential tracks in the cache 14, and an unmodified non-sequential LRU list (not shown) providing a temporal ordering of unmodified non-sequential tracks in the cache 14. It is appreciated that a cache may have lists organized in a variety of formats, depending upon the particular application.

Figure 5:
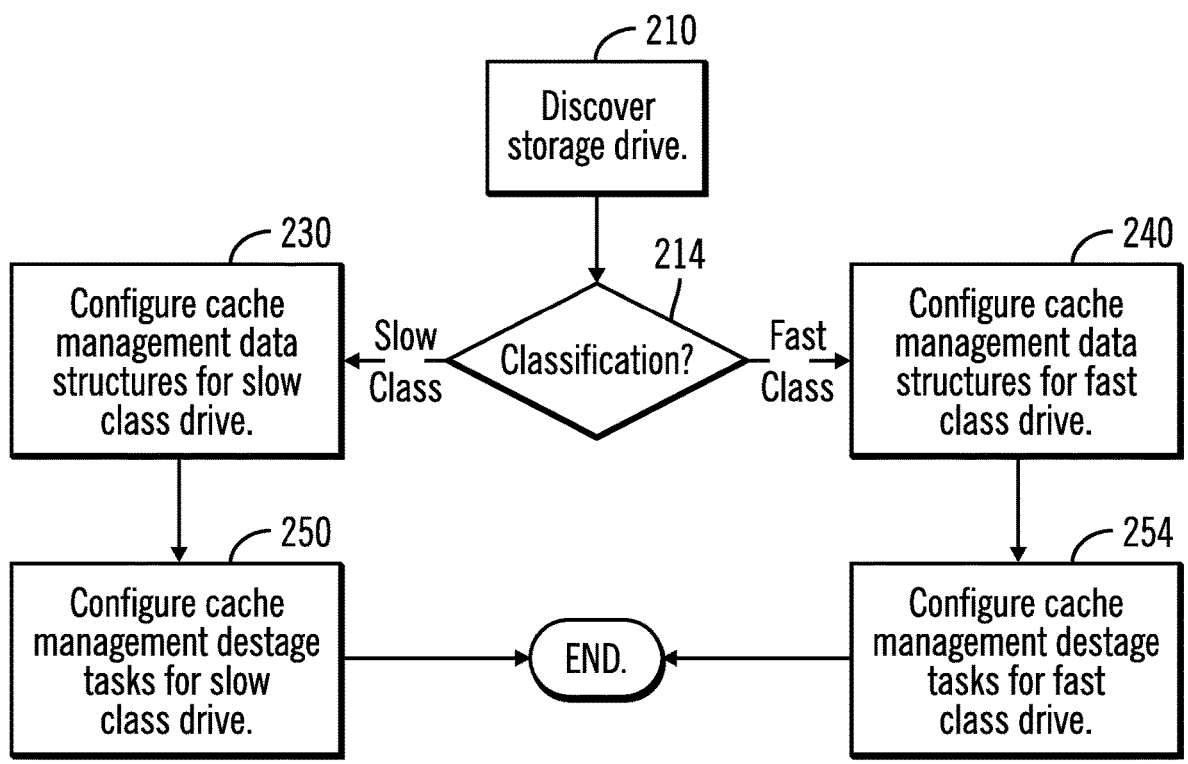
FIG. 5 illustrates an embodiment of operations for storage drive dependent track removal processing in accordance with one aspect of the present description.

FIG. 5 depicts one example of operations of a cache manager such as the cache manager 24 employing storage drive dependent track removal processing in accordance with the present description. The operations of FIG. 5 are performed by a storage drive dependent track removal processing logic 200 (FIG. 6) in this embodiment.

In connection with adding or otherwise discovering (block 210, FIG. 5) a storage drive, the storage drive dependent track removal processing logic 200 (FIG. 6) may be configured to determine (block 214, FIG. 5) whether the discovered storage drive is to be classified as one of a first class and a second class of storage drives. As explained below in connection with FIG. 7, the storage drive dependent track removal processing logic 200 (FIG. 6) may be further configured to perform destage tasks for tracks cached in a cache, which have been configured as a function of whether the storage drive is classified in the first class or in the second class of storage drives.

In one embodiment, the storage drive dependent track removal processing logic 200 (FIG. 6) may include drive classification logic 220 which is configured to classify (block 214, FIG. 5) storage drives on the basis of performance characteristics, for example. Thus, the second class of storage drives may have an input/output speed performance characteristic for example, which exceeds a corresponding input/output speed performance characteristic of the first class of storage drives. Accordingly in this example, storage drives classified in the first class may be referred to generally as a "slow class" drive as compared to storage drives classified in the second class may be referred to generally as a "fast class" drive, for example. It is appreciated that in storage drive dependent track removal processing in accordance with the present description, storage drives may be classified into two or more classifications using other classification criteria, depending upon the particular application.

Figure 2:
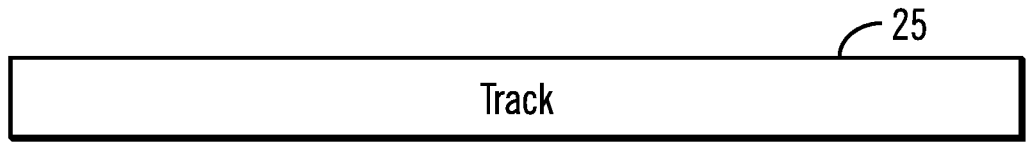
FIG. 2 illustrates an example of a track utilized in the computing environment of FIG. 1.

Depending upon the resultant classification of the discovered storage drive, cache management data structures and destage tasks may be selectively configured for destaging tracks to a storage drive of that classification. For example, if the discovered storage drive is classified (block 214, FIG. 5) as a slow class storage drive, cache management data structure configuration logic 234 (FIG. 6) of the storage drive dependent track removal processing logic 200, is configured to arrange or otherwise configure (block 230, FIG. 5) data structures appropriate to cache management of a slow class storage drive. For example, as shown in FIG. 2, the slow class cache management data structures 104 have been configured (block 230) to include both a main cache list 114 and a wait cache list 134 to which track entries may be transferred from the main cache list 114 to the wait cache list 134.

Conversely, if the discovered storage drive is classified (block 214, FIG. 5) as a fast class storage drive, cache management data structure configuration logic 234 (FIG. 6) of the storage drive dependent track removal processing logic 200, is configured to arrange or otherwise configure (block 240) data structures appropriate to cache management of a fast class storage drive. For example, as shown in FIG. 2, the fast class cache management data structures 108 have been configured (block 240) to include a main cache list 130 but lack a wait cache list since transfer of entries to a wait cache list is bypassed for entries awaiting destaging to a fast class storage drive in one embodiment.

As previously mentioned, depending upon the resultant classification of the discovered storage drive, destage tasks may also be selectively configured for destaging tracks to a storage drive of that classification. For example, if the discovered storage drive is classified (block 214, FIG. 5) as a slow class storage drive, cache management destage task configuration logic 244 (FIG. 6) of the storage drive dependent track removal processing logic 200, is configured to arrange or otherwise configure (block 250) destage tasks appropriate to destaging tracks to a slow class storage drive. Destage tasks appropriate to destaging tracks to a slow class storage are described in greater detail in connection with FIG. 7 below.

Conversely, if the discovered storage drive is classified (block 214, FIG. 5) as a fast class storage drive, cache management destage task configuration logic 244 (FIG. 6) of the storage drive dependent track removal processing logic 200, is configured to arrange or otherwise configure (block 254) destage tasks appropriate to destaging tracks to a fast class storage drive. Destage tasks appropriate to destaging tracks to a fast class storage are also described in greater detail in connection with FIG. 7 below.

Figure 6:
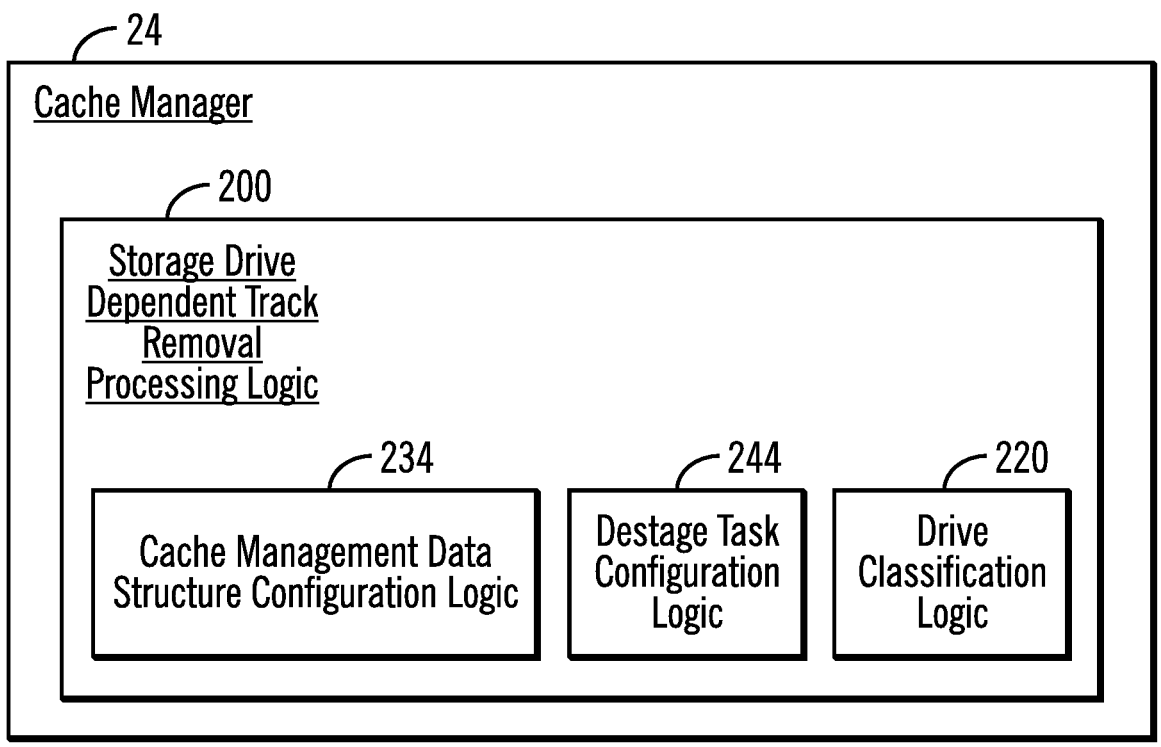
FIG. 6 illustrates an embodiment of storage drive dependent track removal processing logic of a cache manager in accordance with one aspect of the present description.
Figure 7:
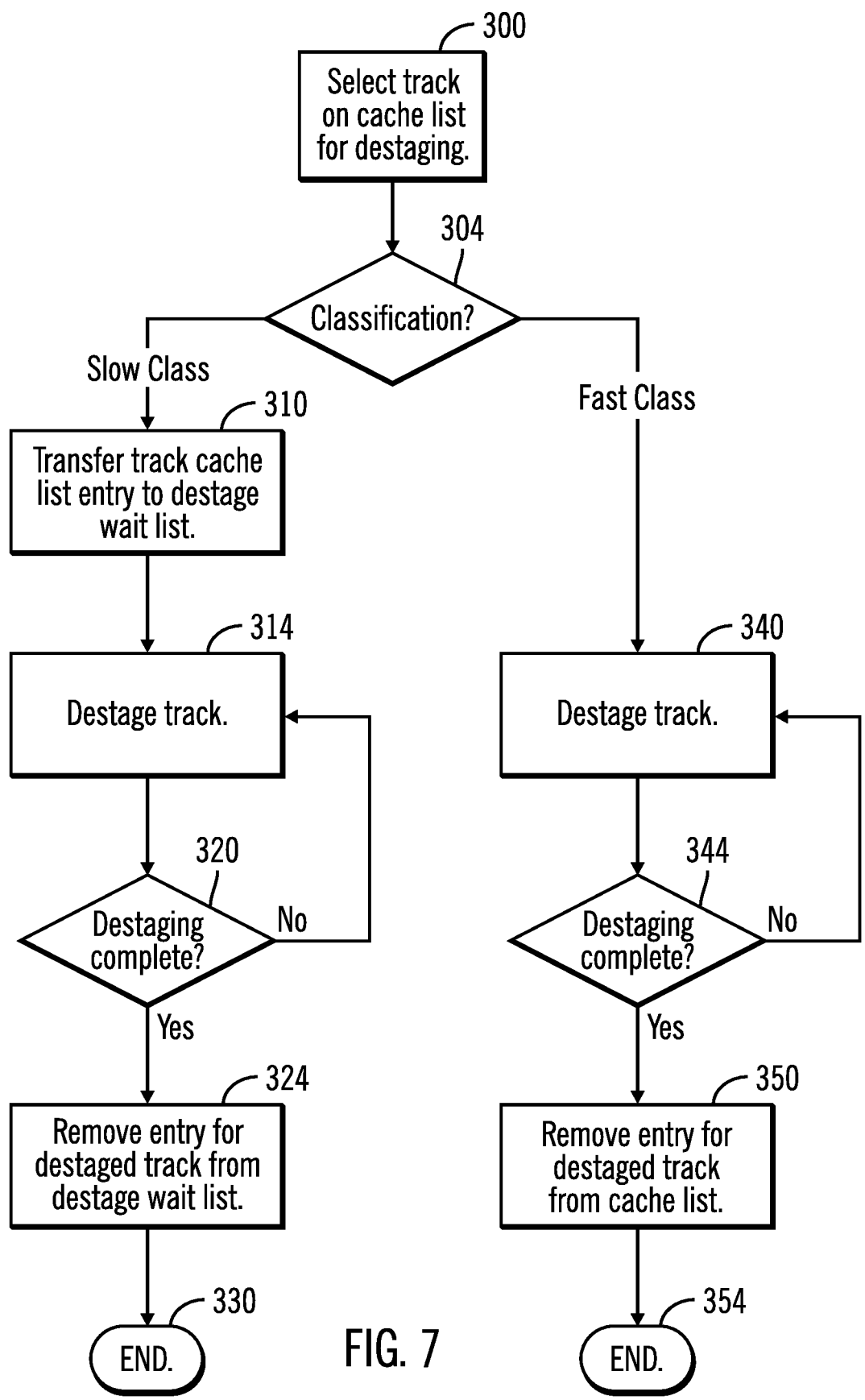
FIG. 7 illustrates an another embodiment of operations for storage drive dependent track removal processing in accordance with another aspect of the present description.

FIG. 7 depicts another example of operations of a cache manager such as the cache manager 24 employing storage drive dependent track removal processing in accordance with the present description. The operations of FIG. 7 are performed by a storage drive dependent track removal processing logic 200 (FIG. 6) in this embodiment.

The storage drive dependent track removal processing logic 200 (FIG. 6) is configured to initiate and perform a destage task to select (block 300) a track for destaging from a cache to a storage drive which has been appropriately classified as a slow class drive or a fast class drive. In this example, a destage task being performed has been configured on the basis of the classification of the storage drive to which the track is to be destaged.

As described above, a storage drive may be classified as a slow class drive or as a fast class drive upon initial discovery of the storage drive in the system. Hence, the classification of the storage drive associated with the destage task may be determined by referring to the results of the classification operation (block 214, FIG. 5) for that storage drive. Thus, the results of the classification operation (block 214, FIG. 5) for that storage drive may be stored in a suitable data structure of the data structures 104, 108, to identify the classification of the storage drive associated with a particular cache list or may be stored in each entry of the associated cache list, for example.

Moreover, cache lists may be configured for individual storage drives which have been classified as discussed above in connection with FIG. 3. Thus, in one embodiment, the classification of the storage drive to which a particular cache list is directed may be determined (block 304, FIG. 7) by the identity of the cache list being scanned by the destage task. Accordingly, the classification of the storage drive for a destage task scanning main cache list 114 may be determined (block 304) to be a slow class since the main cache list 114 is associated with the storage drive 10a which has been classified as a slow class drive. Similarly, the classification of the storage drive for a destage task scanning main cache list 130 may be determined (block 304) to be a fast class since the main cache list 130 is associated with the storage drive 10b which has been classified as a fast class drive.

If the storage drive associated with the selected (block 300) track is determined (block 304) to have been classified as a slow class drive, the storage drive dependent track removal processing logic 200 (FIG. 6) is configured to perform a destage task configured for a slow class storage drive in which the destage task transfers (block 310, FIG. 7) the entry for the selected track from the "main" cache list such as main cache list 114, FIG. 3, for example, and adds it to a secondary cache list (referred to herein as the "wait cache" list, such as the wait cache list 134. FIG. 3, for example) to await destaging (block 314, FIG. 7) to the slow class drive 10a. As a result, other tasks scanning the main cache list will not encounter the cache list entry which has been removed from the main cache list 114 while the selected track awaits destaging. Consequently, task efficiency and resource utilization may be improved in many applications. The storage drive dependent track removal processing logic 200 (FIG. 6) is further configured to, in connection with completion (block 320, FIG. 7) of the destaging of the selected track from the cache to the slow class storage drive 10a, to remove (block 324) the cache list entry for the selected track which had been added to the wait cache list 134, from the wait cache list 134 and end (block 330, FIG. 7) the destage task configured for the slow class drive 10a.

Conversely, if the storage drive has been classified as a fast class drive, the storage drive dependent track removal processing logic 200 (FIG. 6) is configured to perform a destage task configured for a fast class storage drive such as the storage drive 10b, for example, which allows the cache list entry for the selected track to remain on the main cache list 130 while the selected track is being destaged (block 340) to the fast class storage drive 10b. Accordingly, the entry transfer operations (block 310, FIG. 7) described above in connection with a destage task configured for a slow class storage drive, are bypassed (not performed) in a destage task configured for a fast class storage drive in one embodiment. The storage drive dependent track removal processing logic 200 (FIG. 6) is further configured to, in connection with completion (block 344, FIG. 7) of the destaging (block 340) of the selected track from the cache to the fast class storage drive 10b, remove (block 350) the cache list entry for that track which was allowed to remain on the main cache list 130, from the main cache list 130 and end (block 354, FIG. 7) the destage task configured for the fast class drive 10b.

It is appreciated herein that where the storage drive to which the selected track is being destaged is classified as a fast class drive, the destage task may be completed in a relatively short amount of time. Hence, the amount of time that the entry for the selected track remains on the main cache list 130 while the selected track is destaged to the fast class storage drive, may correspondingly be short in duration. As a result, the number of other tasks which might encounter the entry for the selected track on the main cache list 130 may be significantly reduced for a fast class storage drive as compared to the likely number of such encounters should an entry for a track being destaged to a slow class drive, be permitted to remain on the main cache list 114.

In another aspect of the present description, the drive classification logic 220 (FIG. 6) is configured in one embodiment, to classify (block 214, FIG. 5) storage drives as a function of a comparison of the average latency to destage a track to a storage drive, to the average amount of time to obtain a list lock for cache lists. It is appreciated that transferring a cache list entry from the main cache list 114 (FIG. 3) to a wait cache list 134, may employ obtaining and releasing two cache list locks that is, the main cache list lock 114b, to remove the entry from the main cache list 114, and a second cache list lock, that is, the wait cache list lock 134b, to add the entry to the wait cache list 134. By comparison, a destage task configured for a fast class storage drive in one embodiment, bypasses both removing the entry from the main cache list 130 and adding an entry to a different cache list such as a wait cache list.

Thus, it is recognized that in one embodiment, for a storage drive classified as a fast class storage drive, the obtaining and releasing of two list locks may be bypassed. Accordingly, the drive classification logic 220 (FIG. 6) is configured in one embodiment to classify fast class storage drives versus slow class storage drives for storage drive dependent track removal processing in accordance with the present description, as a function of a comparison of the average latency to destage a track to a storage drive, to twice the average amount of time to obtain a list lock for cache lists. If the average latency to destage a track to a storage drive 10b, for example, is less than twice the average amount of time to obtain a list lock 130b for a cache list 130, the storage drive 10b may be classified as a fast class storage drive in this example. Conversely, if the average latency to destage a track to a storage drive such as the storage drive 10a, for example, is greater than twice the average amount of time to obtain a list lock 114b for a cache list 114, the storage drive 10a may be classified as a slow class storage drive in this example.

It is appreciated that other criteria may be used to classify storage drives for storage drive dependent track removal processing in accordance with the present description, depending upon the particular application. For example, the drive classification logic 220 (FIG. 6) may be configured in one embodiment to classify fast class storage drives versus slow class storage drives for storage drive dependent track removal processing in accordance with the present description, as a function of a whether the average latency to destage a track to a storage drive, is greater than N times the average amount of time to obtain a list lock for cache lists and if so, the storage drive may be classified as a slow class storage drive in this example, where N is a variable. In one example, the variable N may be in a range of 1 to 4, for example. Moreover, other performance characteristics may be utilized to classify storage drives for storage drive dependent track removal processing in accordance with the present description, depending upon the particular application. For example, a performance characteristic of a storage drive may be compared to a threshold such that storage drives which exceed the threshold are classified in one class of storage drives and storage drives having a performance characteristic which does not exceed the threshold, are classified in another storage drive classification.

Figure 8:
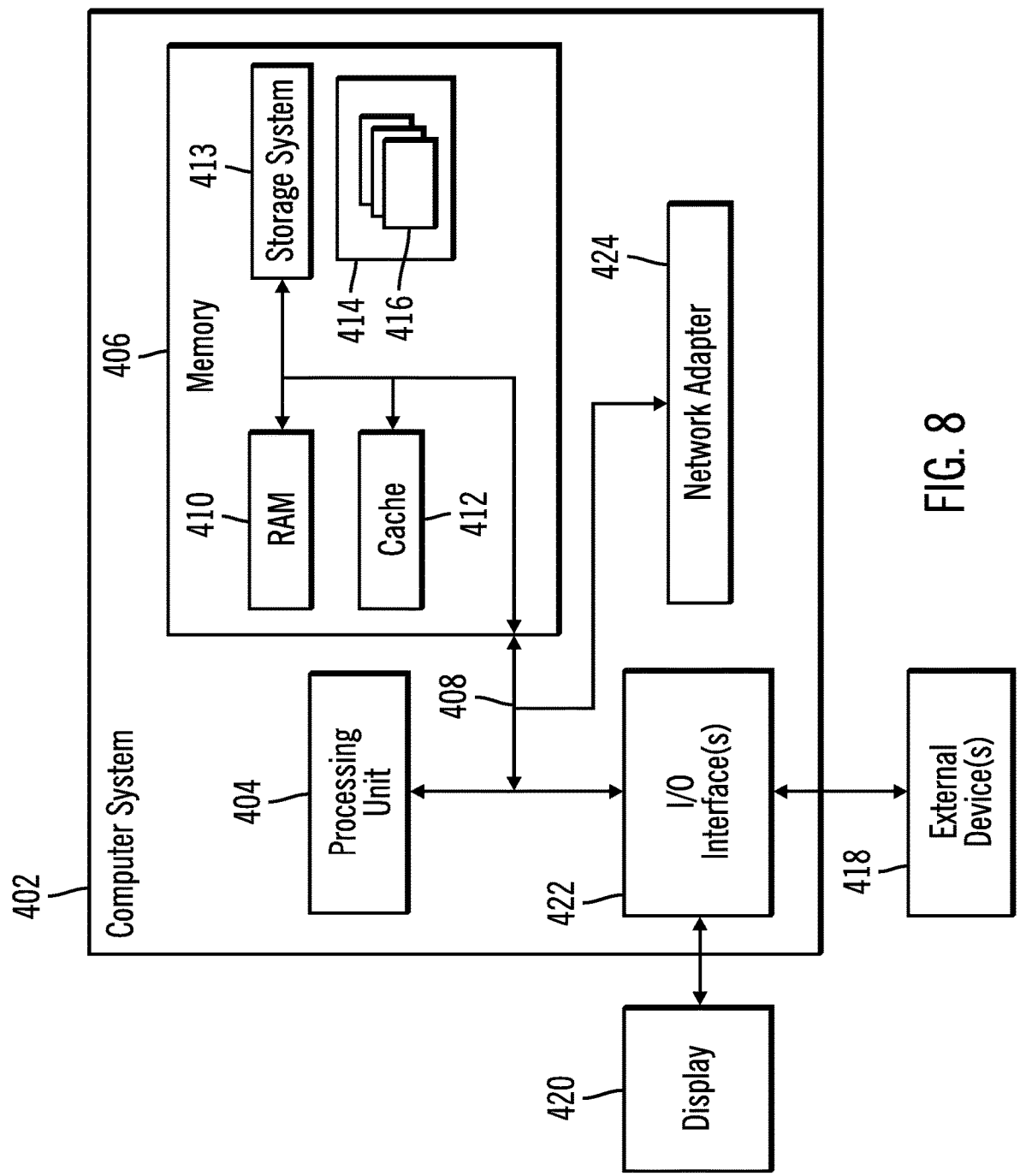
FIG. 8 illustrates a computer embodiment employing storage drive dependent track removal processing in accordance with the present description.

The computational components of FIGS. 1, 3 and 6 including the hosts 2a, 2b . . . 2n, the storage controller or storage control unit 4 and the cache manager 24, may each be implemented in one or more computer systems, such as the computer system 402 shown in FIG. 8. Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computer 402 may be implemented as program modules 416 which generally carry out the functions and/or methodologies of embodiments of the invention as described herein. The system of FIG. 1 may be implemented in one or more computer systems 402, where if they are implemented in multiple computer systems 402, then the computer systems may communicate over a network.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   determining whether a first storage drive is one of a first class and a second class of storage drives wherein the second class of storage drives has an input/output speed performance characteristic which exceeds a corresponding input/output speed performance characteristic of the first class of storage drives; and
   track removal processing tracks cached in a first cache as a function of whether the first storage drive is one of the first class and the second class of storage drives, said track removal processing including performing destage tasks, each destage task including:
   selecting a first track for destaging from the first cache to the first storage drive wherein the selected first track is represented by a first entry of a first cache list of entries representing tracks cached in the first cache;
   initiating destaging of the first track of the destage task;
   in connection with initiation of destaging of the first track of the destage task, if the first storage drive is of the first class, removing the first entry from the first cache list and adding a representation of the selected first track as a second entry to a second cache list of entries wherein the second entry represents the selected first track;
   continuing the destage task including destaging the first track from the first cache to the first storage drive; and
   in response to successful completion of the destaging of the destage task, completing the destage task including:
   removing the second entry from the second cache list if the first storage drive is of the first class; and
   removing the first entry from the first cache list if the first storage drive is of the second class wherein transferring the first entry to the second cache list is bypassed if first storage drive is of the second class and wherein entries for a storage drive of the first class are removed from the first cache list sooner as compared to entries for a storage drive of the second class.

2. The method of claim 1 wherein said determining includes determining whether the first storage drive has an input/output speed performance characteristic which exceeds a threshold.

3. The method of claim 2 wherein said input/output speed performance characteristic of the first storage drive is a function of an average latency of destaging a track from the first cache to the first storage drive.

4. The method of claim 3 wherein the threshold is a function of a duration of time taken to obtain a list lock to the first cache list.

5. The method of claim 1 further comprising configuring destage tasks for the first cache list as a function of the determining whether the first storage drive is one of a first class and a second class of storage drives.

6. The method of claim 5 wherein configuring destage tasks includes configuring each destage task for the first storage drive to remove an entry from the first cache list and add an entry to the second cache list of entries in connection with initiation of each destage task, if the first storage drive is determined to be of the first class, and configuring each destage task for the first storage drive to bypass both removing an entry from the first cache list and adding an entry to the second cache list of entries in connection with initiation of each destage task, if the first storage drive is determined to be of the second class.

7. A device, comprising:
   a plurality of storage drives including a first storage drive;
   a storage control unit configured to control the plurality of storage drives, the storage control unit including:
   a memory having a first cache configured to cache tracks for the first storage drive, and a first data structure including a first cache list and a second cache list, each list configured to have entries configured to represent tracks cached in the first cache including a first entry configured to represent a first track; and
   drive dependent track removal processing logic implemented at least partially in hardware and configured to determine whether the first storage drive is one of a first class and a second class of storage drives wherein the second class of storage drives has an input/output speed performance characteristic which exceeds a corresponding input/output speed performance characteristic of the first class of storage drives, and to perform destage tasks for tracks cached in the first cache as a function of whether the first storage drive is one of the first class and the second class of storage drives, each destage task being configured to:
   select a first track for destaging from the first cache to the first storage drive wherein the selected first track is represented by a first entry of a first cache list of entries representing tracks cached in the first cache;
   initiate destaging of the first track of the destage task;
   in connection with initiation of destaging of the first track of the destage task, if the first storage drive is of the first class, remove the first entry from the first cache list and add a representation of the selected first track as to a second entry of a second cache list of entries wherein the second entry is configured to represent the selected first track;
   continue the destage task including destage the first track from the first cache to the first storage drive; and
   in response to successful completion of the destaging of the destage task, complete the destage task including:
   remove the second entry from the second cache list if the first storage drive is of the first class; and
   remove the first entry from the first cache list if the first storage drive is of the second class wherein transferring the first entry to the second cache list is bypassed if first storage drive is of the second class and wherein entries for a storage drive of the first class are removed from the first cache list sooner as compared to entries for a storage drive of the second class.

8. The device of claim 7 wherein the drive dependent track removal processing logic has drive classification logic implemented at least partially in hardware and configured to determine whether the first storage drive has an input/output speed performance characteristic which exceeds a threshold.

9. The device of claim 8 wherein said input/output speed performance characteristic of the first storage drive is a function of an average latency of destaging a track from the first cache to the first storage drive.

10. The device of claim 9 wherein the threshold is a function of a duration of time taken to obtain a list lock to the first cache list.

11. The device of claim 7 wherein the drive dependent track removal processing logic has destage task configuration logic implemented at least partially in hardware and configured to configure destage tasks for the first cache list as a function of whether the first storage drive is one of a first class and a second class of storage drives.

12. The device of claim 11 wherein the destage task configuration logic is further configured to configure each destage task for the first storage drive to remove an entry from the first cache list and add an entry to the second cache list of entries in connection with initiation of each destage task, if the first storage drive is determined to be of the first class, and to configure each destage task for the first storage drive to bypass both removing an entry from the first cache list and adding an entry to the second cache list of entries in connection with initiation of each destage task, if the first storage drive is determined to be of the second class.

13. A computer program product for use in a computer system having a plurality of storage drives and a storage control unit having a cache and configured to control read operations from and write operations to the storage drives, wherein the computer program product comprises a computer readable storage medium having program instructions embodied therewith, the program instructions executable by a processor of the computer system to cause processor operations, the processor operations comprising:
  determining whether a first storage drive is one of a first class and a second class of storage drives wherein the second class of storage drives has an input/output speed performance characteristic which exceeds a corresponding input/output speed performance characteristic of the first class of storage drives; and
  track removal processing tracks cached in a first cache as a function of whether the first storage drive is one of the first class and the second class of storage drives, said track removal processing including performing destage tasks, each destage task including:
    selecting a first track for destaging from the first cache to the first storage drive wherein the selected first track is represented by a first entry of a first cache list of entries representing tracks cached in the first cache;
    initiating destaging of the first track of the destage task;
    in connection with initiation of destaging of the first track of the destage task, if the first storage drive is of the first class, removing the first entry from the first cache list and adding a representation of the selected first track as a second entry to a second cache list of entries wherein the second entry represents the selected first track;
    continuing the destage task including destaging the first track from the first cache to the first storage drive; and
    in response to successful completion of the destaging of the destage task, completing the destage task including:
      removing the second entry from the second cache list if the first storage drive is of the first class; and
      removing the first entry from the first cache list if the first storage drive is of the second class wherein transferring the first entry is bypassed if first storage drive is of the second class and wherein entries for a storage drive of the first class are removed from the first cache list sooner as compared to entries for a storage drive of the second class.

14. The computer program product of claim 13 wherein said determining includes determining whether the first storage drive has an input/output speed performance characteristic which exceeds a threshold.

15. The computer program product of claim 14 wherein said input/output speed performance characteristic of the first storage drive is a function of an average latency of destaging a track from the first cache to the first storage drive.

16. The computer program product of claim 15 wherein the threshold is a function of a duration of time taken to obtain a list lock to the first cache list.

17. The computer program product of claim 13 wherein the processor operations further comprise configuring destage tasks for the first cache list as a function of the determining whether the first storage drive is one of a first class and a second class of storage drives.

18. The computer program product of claim 17 wherein configuring destage tasks includes configuring each destage task for the first drive to remove an entry from the first cache list and add an entry to the second cache list of entries in connection with initiation of each destage task, if the first storage drive is determined to be of the first class, and configuring each destage task for the first storage drive to bypass both removing an entry from the first cache list and adding an entry to the second cache list of entries in connection with initiation of each destage task, if the first storage drive is determined to be of the second class.

* * * * *